(12) United States Patent
Oomori et al.

(10) Patent No.: US 6,895,239 B2
(45) Date of Patent: May 17, 2005

(54) MOBILE RADIO TERMINAL

(75) Inventors: Hajime Oomori, Hino (JP); Kiyoshi Wagai, Hachioji (JP); Junichi Igarashi, Fussa (JP); Yasuhiro Tsukui, Tsukui-gun (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 10/260,284

(22) Filed: Oct. 1, 2002

(65) Prior Publication Data
US 2003/0083022 A1 May 1, 2003

(30) Foreign Application Priority Data
Oct. 1, 2001 (JP) .................................. 2001-305769

(51) Int. Cl.$^7$ .................................................. H04M 3/42
(52) U.S. Cl. ......................... 455/415; 455/90; 455/414; 455/518; 455/416; 455/417; 455/568.3; 455/568.4
(58) Field of Search .......................... 455/90, 415, 414, 455/518, 416, 417, 568.3, 568.4

(56) References Cited

U.S. PATENT DOCUMENTS

| | | | |
|---|---|---|---|
| 6,018,668 A | * 1/2000 | Schmidt | 455/518 |
| 6,094,565 A | 7/2000 | Alberth et al. | |
| 6,215,993 B1 | * 4/2001 | Ulveland | 455/415 |
| 6,366,771 B1 | * 4/2002 | Angle et al. | 455/414 |
| 6,573,825 B1 | * 6/2003 | Okano | 340/7.51 |

FOREIGN PATENT DOCUMENTS

EP            0 901 263 A          3/1999

* cited by examiner

*Primary Examiner*—David Hudspeth
*Assistant Examiner*—David Q Nguyen
(74) *Attorney, Agent, or Firm*—Oblon, Spivak, McClelland, Maier & Neustadt, P.C.

(57) ABSTRACT

A folding detecting unit detects whether or not the corresponding mobile radio terminal is in the folded state. A storage unit stores phone numbers of mobile terminals and automatic response data in the form of a table. A communication control unit refers to information stored in the storage unit when an incoming call occurs and, when the folding detecting unit detects that the terminal is changed from the folded or closed state to the unfolded or opened state, responds to the incoming call to initiate communication according to the automatic response data for the originating terminal.

3 Claims, 5 Drawing Sheets

| NAME | PHONE NUMBER | MAIL ADDRESS | AUTOMATIC RESPONSE DATA |
|---|---|---|---|
| HAJIME | 09012345678 | hajime@×××.co.jp | 1 |
| KIYOSHI | 0421234567 | kiyoshi@△△△.co.jp | 0 |
| JUNICHI | 0312345678 | jun@×××.co.jp | 1 |
| YASUHIRO | 07012345678 | yasu@○○○.co.jp | 1 |
| ⋮ | ⋮ | ⋮ | ⋮ |

| NAME | PHONE NUMBER | MAIL ADDRESS | GROUP NUMBER |
|---|---|---|---|
| HAJIME | 09012345678 | hajime@×××.co.jp | 1 |
| KIYOSHI | 0421234567 | kiyoshi@△△△.co.jp | 2 |
| JUNICHI | 0312345678 | jun@×××.co.jp | 3 |
| YASUHIRO | 07012345678 | yasu@○○○.co.jp | 3 |
| ⋮ | ⋮ | ⋮ | ⋮ |

FIG. 7

| GROUP NUMBER | AUTOMATIC RESPONSE DATA | MELODY TYPE |
|---|---|---|
| 1 | 1 | 001 |
| 2 | 0 | 002 |
| 3 | 1 | 003 |
| ⋮ | ⋮ | ⋮ |

FIG. 8

MOBILE RADIO TERMINAL

CROSS-REFERENCE TO THE RELATED APPLICATIONS

This application is based upon and claims the benefit of priority from the prior Japanese Patent Application No. 2001-305769, filed Oct. 1, 2001, the entire contents of which are incorporated herein by reference.

BACKGROUND OF THE INVENTION

1. Field of the Invention

The present invention relates to a mobile communication system, such as a cellular phone system, and more specifically to a mobile radio or wireless terminal which can be folded or which has a cover or lid that can be opened or closed.

2. Description of the Related Art

As is well known, mobile radio terminals for use with mobile communication systems, such as cellular phone systems, include ones which can be folded and ones which have a cover that can be opened or closed. Such mobile radio terminals allow protection of the display unit and prevention of misoperations due to unintentional contact with the operating unit through their capability to be folded or covered.

With the aforementioned mobile radio terminals, however, in the event that an incoming call occurs while they are being folded or covered, it is required to unfold or uncover them and then operate the key entry unit in order to respond to the call.

Therefore, it is difficult to respond quickly to the incoming call and it is troublesome to perform responding operations. Accordingly, the conventional mobile radio terminals have a problem of being low in operability.

BRIEF SUMMARY OF THE INVENTION

It is therefore an object of the present invention to provide a mobile radio terminal which, even when an incoming call occurs while it is folded or covered, permits response to be made readily to the incoming call and is therefore high in operability.

According to an aspect of the present invention, there is provided a mobile radio terminal having a structure capable of opening or closing a housing, comprising: incoming call detecting means responsive to a signal received from the base station for detecting the occurrence of an incoming call; opening or closing detecting means for detecting the opening or closing of the housing; and communication control means responsive to the opening or closing detecting means for responding to the incoming call to initiate communication when the terminal is changed from the closed state to the opened state.

The mobile radio terminal, on occurrence of an incoming call, can make response to the incoming call to initiate communication with the originating terminal by being changed from the folded state to the unfolded state.

According to the mobile radio terminal, therefore, even when an incoming call occurs while it is folded or covered, response can be made readily to the incoming call and the operability can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 shows anther example of telephone directory data stored in the storage unit of the mobile radio terminal shown in FIG. 1; and FIG. 8 shows one example of group setting data stored in the storage unit of the mobile radio terminal shown in FIG. 1.

DETAILED DESCRIPTION OF THE INVENTION

An embodiment of the present invention will be described hereinafter with reference to the accompanying drawings.

Figure 1:
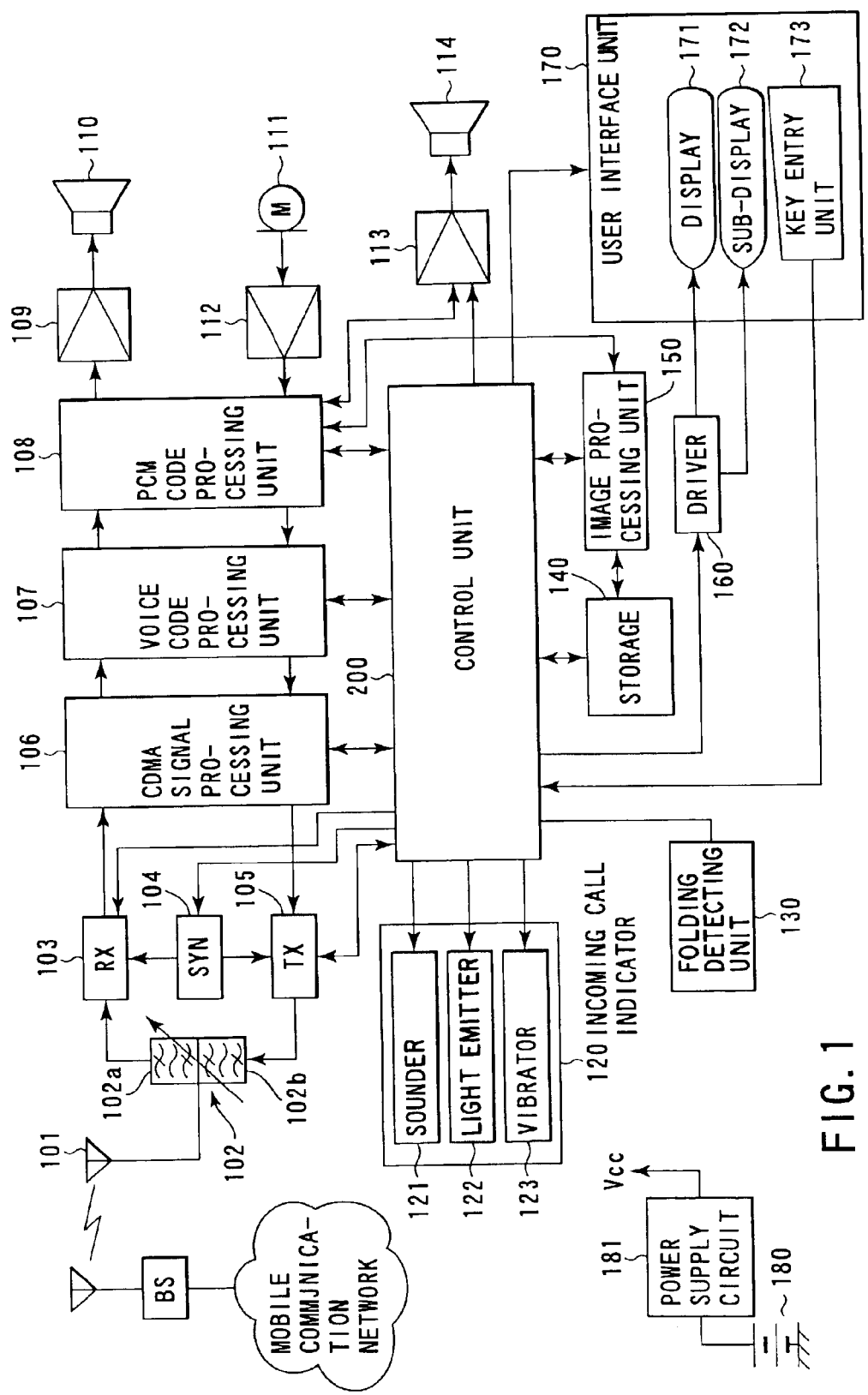
FIG. 1 is a block diagram of a mobile radio terminal according to an embodiment of the present invention.

FIG. 1 is a block diagram of a mobile radio terminal embodying the present invention, which is adapted to make CDMA (Code Division Multiple Access)-based radio communication with a base station BS.

A radio-frequency signal transmitted from the base station BS and received by an antenna 101 is input to an antenna sharer 102, which comprises a receiving filter 102a and a transmitting filter 102b.

Of radio-frequency signals input from the antenna 101, a radio-frequency signal transmitted from the base station BS is input through the receiving filter 102a to a receiving unit (RX) 103. This received radio-frequency signal will never be input to a transmitting unit 105 to be described later owing to the transmitting filter 102b.

In the receiving unit 103, the radio frequency signal is converted into an intermediate-frequency signal by being mixed with a receiving local oscillator signal from a frequency synthesizer (SYN) 104.

The frequency of the receiving local oscillator signal generated by the frequency synthesizer 104 is controlled by a control unit 200. The receiving unit 103 has a function of detecting the strength of a received radio signal of a frequency specified by the control unit 200.

The intermediate-frequency signal obtained by the receiving unit 103 is subjected to quadrature demodulation, and despread in a CDMA signal processing unit 106. The resulting signal is converted into receive data in a predetermined format corresponding to the data rate.

Of the receive data, data indicating the data rate or electronic mail data are output to the control unit 200, while voice data is output to a voice code processing unit 107.

The CDMA signal processing unit 106 detects from the received data the occurrence of an incoming call to the corresponding mobile radio terminal and the phone number of the originating terminal presented from the base station BS and then notifies the control unit 200 of these information.

The voice code processing unit 107 performs expansion processing on the received data obtained in the CDMA signal processing unit 106 according to the rate of the received data presented from the control unit 200 and then outputs the result to a PCM code processing unit 108.

The PCM code processing unit 108 decodes the received data expanded in the voice code processing unit 107 to obtain an analog voice signal, which is amplified by an amplifier 109 and then output audibly by a loudspeaker 110.

The voice of a talker is input to a microphone (M) 111 for conversion into an analog send speech signal, which is amplified up to an appropriate level in an amplifier 112, then PCM coded in the PCM code processing unit 108 and output to the voice code processing unit 107 as transmit data.

The voice code processing unit 107 detects the amount of energy of the input voice from the transmit data output from the PCM code processing unit 108, then determines a data rate based on the result and presents it to the control unit 200. The transmit data is compressed into a burst signal in a format corresponding to that data rate and then output to the CDMA signal processing unit 106.

The CDMA signal processing unit 106 performs diffusion processing on the burst signal compressed in the voice code processing unit 107 or transmit electronic mail data input from the control unit 200 using PN codes corresponding to a transmission channel. The CDMA signal processing unit then performs quadrature modulation processing on the result of the diffusion processing to produce a quadrature modulated signal, which is output to the transmitting unit (TX) 105.

When instructed by the control unit 200 to respond to an incoming call by way of example, the CDMA signal processing unit 106 adds corresponding control data to the result of the diffusion processing and then performs quadrature modulation processing.

The transmitting unit 105 combines the quadrature modulated signal with a transmission local oscillator signal to produce a radio-frequency signal. The transmitting unit 105 amplifies only an effective portion of the radio-frequency signal based on the transmit data rate presented from the control unit 200 and outputs it to the antenna sharer 102. The transmission local oscillator signal, which is produced by the frequency synthesizer 104, has a frequency corresponding to a control signal from the control unit 200.

Of the radio-frequency signal output from the transmitting unit 105 and input to the antenna sharer 102, only a radio-frequency signal in a transmission band is output to the antenna through the transmitting filter 102b and radiated into space toward the base station BS. The radio-frequency signal in the transmission band will never be input to the receiving unit 103 owing to the receiving filter 102a.

An incoming call indicator 120 is adapted to, on the occurrence of an incoming call to the corresponding terminal, inform the user of the incoming call under control of the control unit 200 and comprises a sounder 121 which generates audible sound to inform the user of the incoming call, a light emitter 122 which generates light, and a vibrator 123, such as an eccentric motor, which generates vibration.

Figures 2, 3:
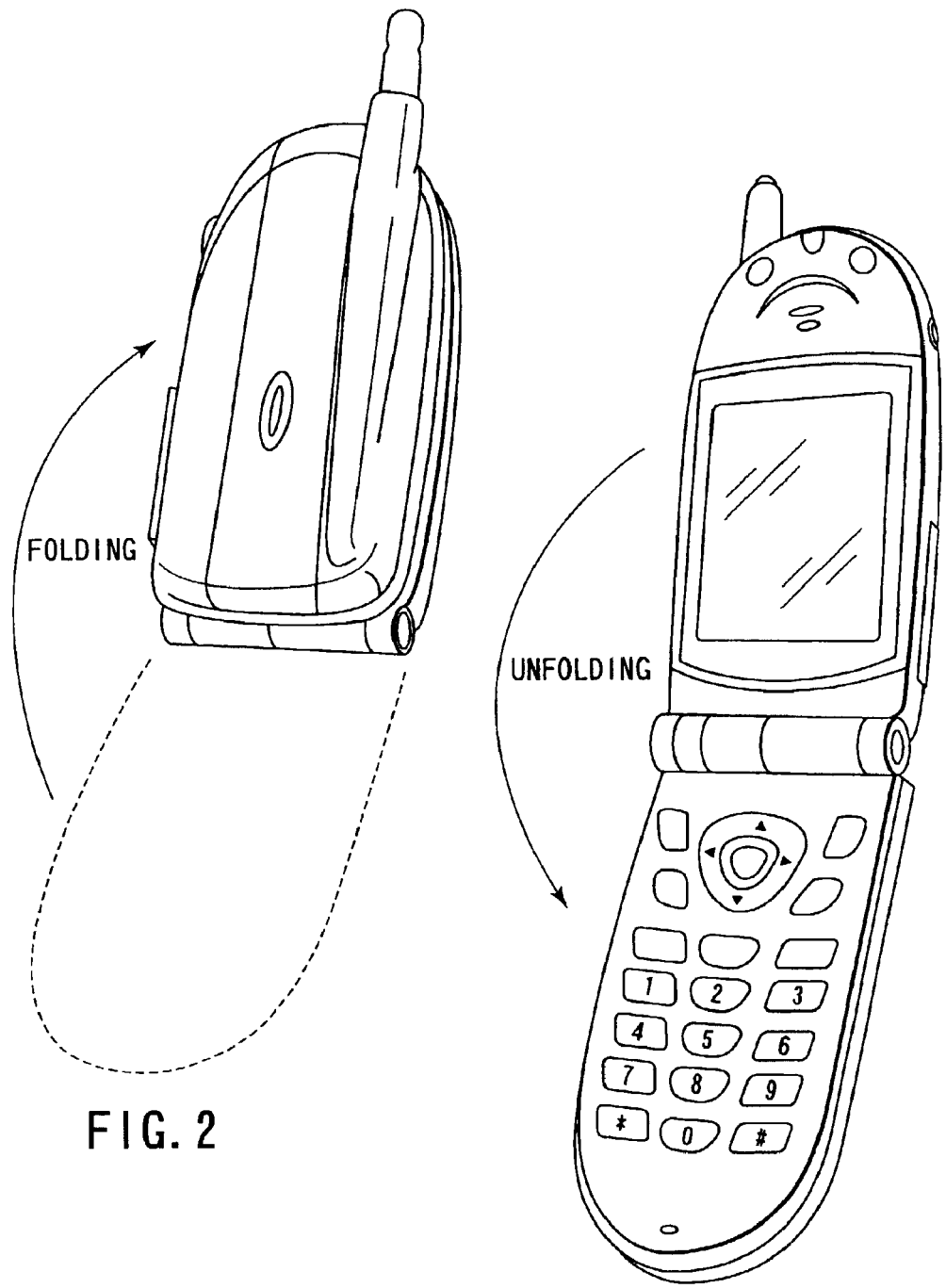
FIG. 2 is a perspective view of the mobile radio terminal shown in FIG. 1 when it is folded.
FIG. 3 is a perspective view of the mobile radio terminal shown in FIG. 1 when it is unfolded.

A folding detecting unit 130 is adapted to detect whether the corresponding terminal is folded (the state shown in FIG. 2) or unfolded (the state shown in FIG. 3) and presents the result to the control unit 200.

Figures 4, 5:
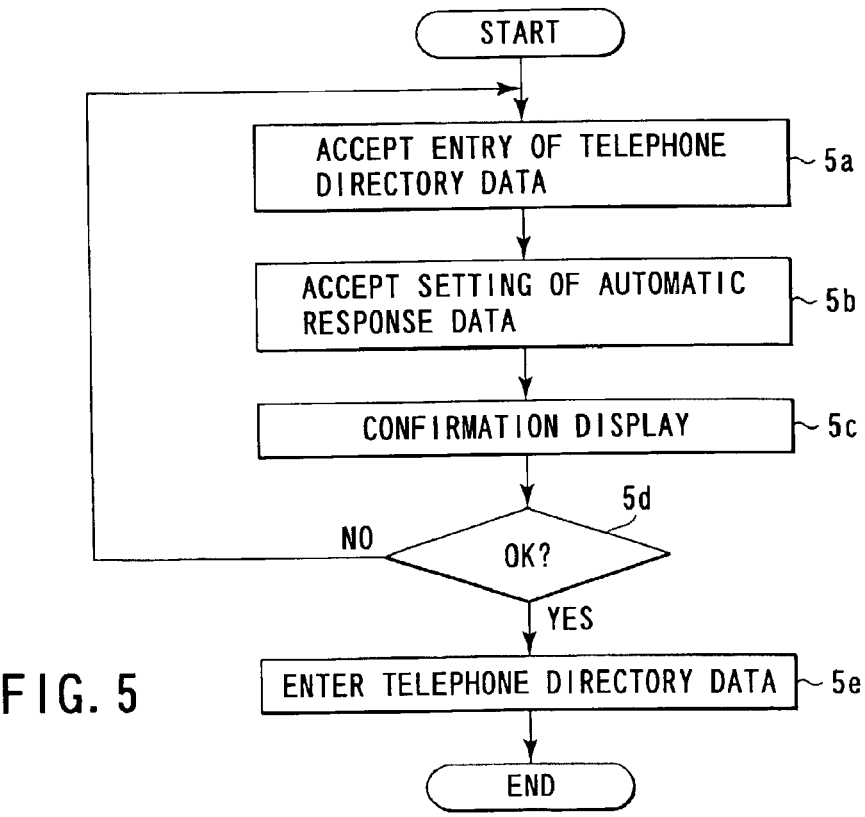
FIG. 4 shows one example of telephone directory data stored in the storage unit of the mobile radio terminal shown in FIG. 1.
FIG. 5 is a flowchart illustrating the process of setting the telephone directory data in the mobile radio terminal shown in FIG. 1.

A storage unit 140 uses a semiconductor memory, such as a ROM or RAM, as a storage medium. The storage medium is stored with user-created data including telephone directory data in which, for example, as shown in FIG. 4, names are mapped into phone numbers and electronic mail addresses, moving image data (moving images and associated sound), received electronic mail, transmitted electronic mail, etc. These information is written and read through the control unit 200.

An image processing unit 150 reads moving image data stored in the storage unit 140 as instructed by the control unit 200 and performs given image processing on the read data to obtain image data and sound data. The image data is output to a driver 160, while the sound data is output to the PCM code processing unit 108.

The driver 160 is responsive input image data from the image processing unit 150 to drive a display 171 in a user interface unit 170, thereby displaying a still image or moving images.

The sound data output from the image processing unit 150 is converted into analog sound data in the PCM code processing unit 108, then amplified in the amplifier 113 and sounded by the loudspeaker 114.

The amplification level of the amplifier 113 is controlled by the control unit 200.

The user interface unit 170 comprises the display 171, a sub-display 172, and a key entry unit 173. The display 171, which is comprised of, for example, a liquid crystal display (LCD) or an electro luminescence (EL) display, visually indicates to the user the conditions of the corresponding terminal (outgoing call/incoming call, battery condition, field strength), dial data read from the storage unit 140, and various images including moving images.

The sub-display 172 is comprised of a small-sized LCD and mounted on the back of the corresponding terminal and adapted to inform the user of the conditions of the terminal and the occurrence of an incoming call when the terminal is folded.

The key entry unit 173 includes keys for performing a normal talking function associated with sending and receiving operations, such as ten keys for dial number entry, and keys for various setting operations, such as switching incoming call indicating ways (audible sound generation, light emission, vibration, and no indication), and various functions.

The control unit 200 is comprised of a CPU, a ROM, and a RAM. The CPU controls each component of the terminal in accordance with control programs and control data stored in the ROM.

As the main control function, the control unit 200 has a communication control function of controlling the receiving unit 103, the frequency synthesizer 104, the transmitting unit 105, and the CDMA signal processing unit 106 to establish a CDMA-based communication link with the base station BS for voice communication and data communication, such as electronic mail, over a mobile communication network in which the base station BS is accommodated.

In addition, the control unit 200 has a control function of, when a request for playback of moving images is made by the user through the key entry unit 173, controlling the image processing unit 150 to allow the moving images to be played back.

As an additional control function, the control unit 200 has a function of accepting a request for response to an incoming call from the user on the basis of the result of detection by the folding detecting unit 130, the phone number of the originating terminal presented from the base station BS at the occurrence of the incoming call, and the telephone directory data stored in the storage unit 140.

A power supply circuit 181 produces a predetermined supply voltage Vcc from the output of a battery 180 and applies it to each circuit.

The operation of the mobile radio terminal thus configured will be described next.

In the description which follows, we will describe the operation associated with response control at the occurrence of an incoming call but omit the operation associated with normal voice communication and data communication (e.g., transmission and reception of electronic mail).

FIG. 5 is a flowchart for telephone directory data creation. This processing is performed by the control unit 200.

First, in step 5a, the control unit 200 controls the image processing unit 150 to display an input acceptance screen for telephone directory data on the display 171. The control unit 200 accepts entry of a name, phone number and electronic mail address through the key entry unit 173 and then goes to step 5b.

In step 5b, the control unit 200 accepts through the key entry unit 173 whether or not the automatic response function is to be set up on the name input in step 5a.

In step 5c, the control unit 200 controls the image processing unit 150 to display 171 the contents received from the user in steps 5a and 5b, asking the user to confirm that he or she wants to enter the contents. The procedure then goes to step 5d.

In step 5d, the control unit 200 accepts through the key entry unit 173 a command of whether to enter the contents displayed in step 5c into the telephone directory data or not. When a command is given to enter the displayed contents, the procedure goes to step 5e; otherwise, the procedure goes to step 5a.

In step 5e, the control unit 200 records the contents received from the user in steps 5a and 5b into the storage unit 140 as telephone directory data. Then, the procedure is complete.

In the presence of a command to set up the automatic response function, a 1 is recorded as automatic response data; otherwise, a 0 is recorded as automatic response data.

The operation associated with response control at the occurrence of an incoming call will be described next.

Figure 6:
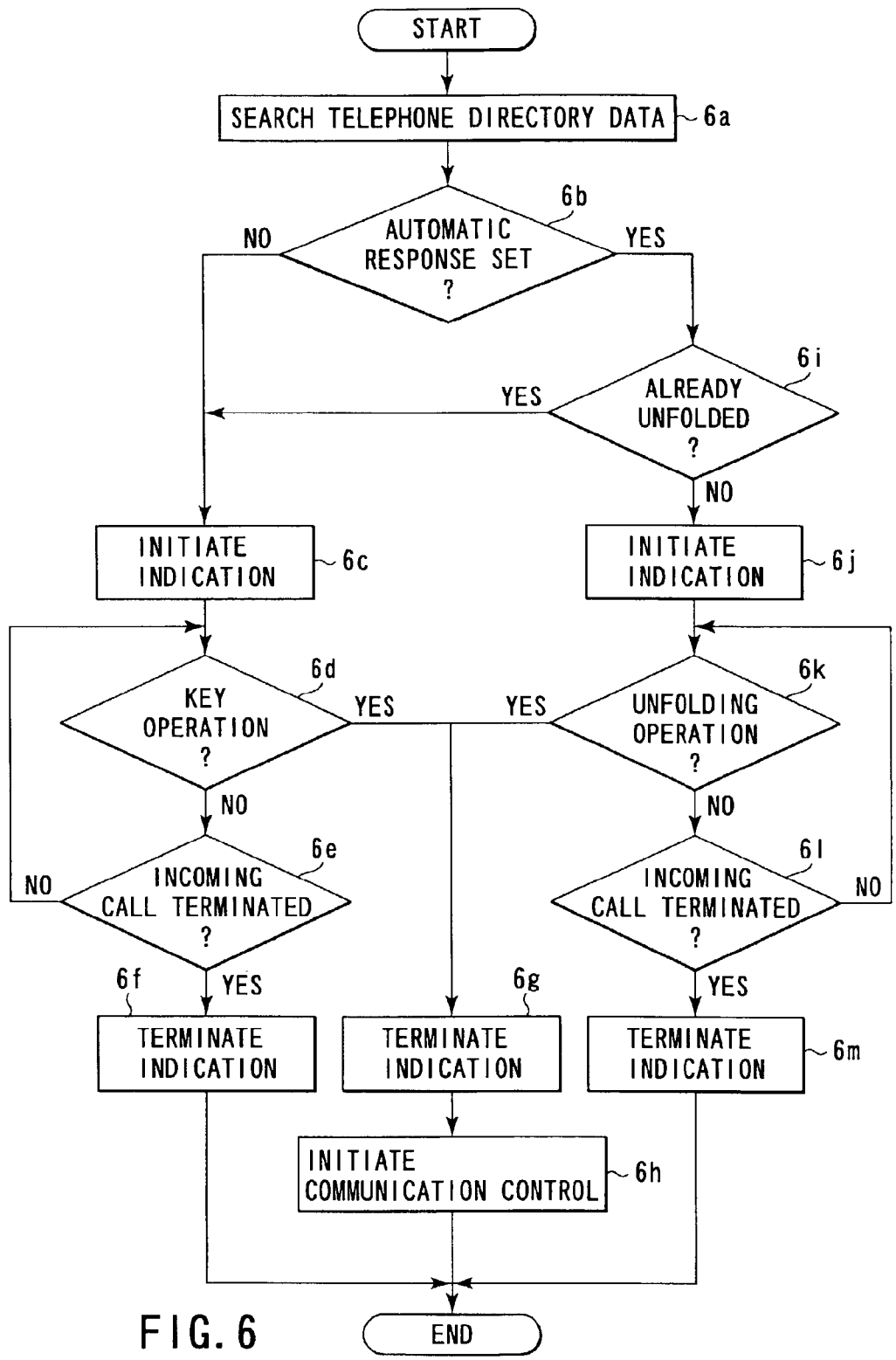
FIG. 6 is a flowchart illustrating processing at the occurrence of an incoming call in the mobile radio terminal shown in FIG. 1.

FIG. 6 is a flowchart for the processing associated with response control at the occurrence of an incoming call. This processing is performed by the control unit 200 and initiated on occurrence of the incoming call.

First, in step 6a, on the basis of the phone number of the originating terminal presented from the base station BS at the occurrence of an incoming call the control unit 200 searches the telephone directory data stored in the storage unit 140 for data coincident with that phone number. The procedure then goes to step 6b.

In step 6b, the control unit 200 makes a decision of whether or not automatic response has been set up on the telephone directory data detected in step 6a, i.e., whether or not the corresponding automatic response data is 1.

When the automatic response data is 1, the procedure goes to step 6i. On the other hand, when the automatic response data is 0 or when the phone number of the originating terminal is not found in the telephone directory, the procedure goes to step 6c.

In step 6c, the control unit 200 drives at least one of the sounder 121, the light emitter 122, and the vibrator 123 to initiate the indication of the occurrence of an incoming call. Also, the control unit 200 displays the name entered into the telephone directory and detected in step 6a on the display 171 and then goes to step 6d.

In step 6d, the control unit 200 makes a decision of whether or not an entry to respond to the incoming call has been made through the key entry unit 173. If such an entry has been made, then the procedure goes to step 6g; otherwise, the procedure goes to step 6e.

In step 6e, the control unit 200 makes a decision of whether or not the incoming call has terminated.

If the incoming call has terminated, then the procedure goes to step 6f; otherwise, the procedure goes to step 6d.

In step 6f, the control unit 200 terminates the incoming call indication initiated in step 6c. Then, the procedure is complete.

In step 6g, the control unit 200 terminates the incoming call indication initiated in step 6c and then goes to step 6h.

In step 6h, the control unit 200 controls the CDMA signal processing unit 106 to transmit a response signal to the base station BS, thereby setting up a communication link with the base station BS to initiate voice communication. Then, the procedure is complete.

In step 6i, on the basis of the result of detection by the folding detecting unit 130 the control unit 200 makes a decision of whether or not the corresponding mobile radio terminal has been unfolded.

If the terminal has been unfolded, the procedure goes to step 6c. If, on the other hand, the terminal has not been unfolded (i.e., folded), the procedure goes to step 6j.

In step 6j, the control unit 200 drives at least one of the sounder 121, the light emitter 122, and the vibrator 123 to initiate the indication of the occurrence of an incoming call. Also, the control unit 200 displays the name entered into the telephone directory and detected in step 6a on the display 171 and then goes to step 6k.

In step 6k, the control unit 200 makes a decision of whether or not the terminal has been changed from the folded state to the unfolded state on the basis of the result of detection by the folding detecting unit 130.

If the state of the terminal has changed to unfolded, the procedure goes to step 6g; otherwise, the procedure goes to step 6l.

In step 6l, the control unit 200 makes a decision of whether or not the incoming call has terminated.

If the incoming call has terminated, then the procedure goes to step 6m; otherwise, the procedure goes to step 6k.

In step 6m, the control unit 200 terminates the incoming call indication initiated in step 6j. Then, the procedure is complete.

As described above, with the mobile radio terminal thus constructed, when an incoming call occurs while it is folded, response can be made to the incoming call by simply unfolding the terminal.

Therefore, the mobile radio terminal is very convenient in that the incoming call received in the folded state (closed state) can be responded to easily. It is merely a matter of unfolding the mobile radio terminal.

In addition, with the mobile radio terminal, automatic response data indicating whether to respond to an incoming call or not by changing the terminal from the folded to the unfolded state has been recorded beforehand in association with each telephone directory data.

Based on the automatic response data, the function of responding to the incoming call in response to the unfolding operation is enabled or disabled for each of the callers' telephone numbers which are known to the user at the time of call reception.

Whether to enable the function or to disable it can be determined for each of the callers. If the caller is a person the receiver does not want to answer, the function is disabled. In this case, the call from the caller is not responded to even if the terminal is unfolded.

In the above embodiment, whether to make automatic response or not is set for each originating terminal's phone number. It is also possible to divide telephone directory data into groups and set whether to make automatic response or not for each group.

To implement such control, the storage unit 140 is recorded with telephone directory data in which group number data is added to each phone number as shown in FIG. 7 and group setting data indicating whether to make automatic response or not for each group as shown in FIG. 8.

In this case, in step 6*a*, reference is made to the telephone directory data to detect the group number from the phone number of an originating terminal and, in step 6*b*, reference is made to the group setting data to make a decision of whether or not automatic response has been set up on the group number detected in step 6*a*.

In the indicating operation initiated in step 6*c* or 6*j*, an incoming call indicating melody is played back which corresponds to the melody type number set in the group setting data.

It is also possible to change incoming call indicating melodies with originating terminals.

In this case, melody type indicating data as shown in FIG. 8 is set for each originating terminal data. At the occurrence of an incoming call from an originating terminal, the corresponding melody to that originating terminal is played back.

The present invention may be practiced or embodied in still other ways without departing from the scope and spirit thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication terminal comprising:

a first case;

a second case openable and closable toward the first case;

a memory configured to store a telephone number of a communication party and information associated with the communication party indicating whether an incoming call from the communication party is acceptable or not;

a first detector configured to detect an incoming call from the communication party;

an identification information acquisition device configured to obtain the telephone number from the detected incoming call;

a second detector configured to detect a change of the second case from a closed state to an open state; and a controller configured to accept the detected incoming call when the second detector detects the status change of the second case and the information associated with the obtained telephone number indicates the detected incoming call is acceptable.

2. A communication terminal comprising:

a first case;

a second case openable and closable toward the first case;

a first memory configured to store a telephone number of a communication party and group information assigned to the communication party;

a second memory configured to store the group information and information associated with the communication party who was assigned with the group information indicating whether an incoming call from the communication party is acceptable or not;

a first detector configured to detect an incoming call from the communication party;

an identification information acquisition device configured to obtain the telephone number from the detected incoming call;

a second detector configured to detect a change of the second case from a closed state to an open state; and a controller configured to accept the detected incoming call when the second detector detects the status change of the second case and the information associated with the obtained telephone number indicates the detected incoming call is acceptable.

3. A communication terminal comprising:

a first case;

a second case openable and closable toward the first case;

a memory configured to store a telephone number of a communication party, group information assigned to the communication party, and information indicating whether an incoming call from the communication party who was assigned with the group information is acceptable or not;

a first detector configured to detect an incoming call from the communication party;

means for obtaining the telephone number from the detected incoming call;

a second detector configured to detect a change of the second case from a closed state to an open state; and a controller configured to accept the detected incoming call when the second detector detects the status change of the second case and the information associated with the obtained telephone number indicates the detected incoming call is acceptable.

* * * * *